United States Patent [19]

Wang et al.

[11] Patent Number: 5,447,030

[45] Date of Patent: Sep. 5, 1995

[54] VEHICLE BRAKE BOOSTER

[75] Inventors: Nui Wang, Croydon; Patrick F. Sawyer, Ferntree Cully, both of Australia

[73] Assignee: PBR Automotive Pty. Ltd., Victoria, Australia

[21] Appl. No.: 132,308

[22] Filed: Oct. 6, 1993

[30] Foreign Application Priority Data

Oct. 9, 1992 [AU] Australia .................. PL5181

[51] Int. Cl.6 .................................. B60T 13/20
[52] U.S. Cl. ........................ 60/552; 92/128; 92/152; 92/169.3; 403/22
[58] Field of Search ............... 60/552, 554; 92/128, 92/152, 161, 169.2, 169.3; 403/335, 337, 315, 21, 22; 411/111, 112

[56] References Cited

U.S. PATENT DOCUMENTS

| | | | |
|---|---|---|---|
| 2,157,641 | 5/1939 | Tinnerman | 403/21 |
| 2,180,266 | 11/1939 | Tinnerman | 411/112 |
| 2,860,741 | 11/1958 | Flora | 403/21 |
| 2,907,418 | 10/1959 | Hudson et al. | 403/21 |
| 4,291,534 | 9/1981 | Jones | 92/169.3 |
| 4,462,710 | 7/1984 | Leitner | 403/21 |
| 4,542,680 | 9/1985 | Takeuchi | 91/369.2 |
| 4,783,964 | 11/1988 | Fanelli et al. | 92/169.3 |
| 4,944,214 | 7/1990 | Briggs | 91/376 R |

FOREIGN PATENT DOCUMENTS 2421357 11/1975 Germany .................. 411/112

OTHER PUBLICATIONS

Fasteneering, Central Screw Company, 1947, pp. 62, 63, 115, 123, TJ1320.C4.

Primary Examiner—F. Daniel Lopez
Attorney, Agent, or Firm—Oliff & Berridge

[57] ABSTRACT

A brake booster mounting including a support to which the booster is securable by means of at least one mounting bolt, and a captive nut located on a side of the support opposite to that to which the booster is to be attached and which is engageable by the bolt so as to effect attachment of the booster to the support. The captive nut is held against separation from the support and is also held against rotation by a retainer so that connection of the bolt to the nut can be effected from the side of the support to which the booster is to be attached. A pilot section on one end of the bolt locates within the captive nut so as to thereby automatically position the nut to be cooperable with a threaded portion of the bolt. The bolt also serves to hold separable parts of the booster housing against separation, and is rotatable relative to those parts to permit the booster to be attached to or detached from the support. The bolt further serves to attach a brake master cylinder to the booster, and has a tool engaging facility at the end remote from the pilot section.

16 Claims, 4 Drawing Sheets

VEHICLE BRAKE BOOSTER

BACKGROUND OF THE INVENTION

This invention relates to vehicle brake boosters, and is particularly concerned with the manner in which such boosters are secured to the body of a vehicle.

Vehicle brake boosters generally have a relatively large hollow housing through which the braking force is transmitted to the master cylinder, and that housing needs to be firmly secured to the vehicle body. In many cases, the booster housing is secured to the fire wall of the vehicle body so as to be located within the vehicle engine compartment. Various techniques have been used to secure the booster housing in position, but they are generally inconvenient and labour intensive to the extent that they do not satisfy present day needs for rapid vehicle assembly.

One prior technique for mounting the booster housing involves the use of two bolts which extend completely through the housing, and each of which has an end portion extending through the vehicle fire wall. An advantage of that through bolt technique is that the bolts can serve to hold separately formed parts of the housing in assembly, as well as serving to hold that assembly to the fire wall. A difficulty with the technique however, is that the mounting operation requires involvement of two people, one to manipulate the mounting bolts from inside the engine compartment, and another to hold cooperative nuts at the inside of the fire wall.

SUMMARY OF THE INVENTION

It is an object of the present invention to provide brake booster mounting means which is convenient to use and which is of relatively simple form. It is a particular object of the invention to provide an improved form of the through bolt mounting technique. It is a further object of the invention to provide an improved brake booster assembly. It is yet another object of the invention to provide improved means for securing a booster to a support.

In accordance with one aspect of the present invention, there is provided a brake booster mounting including, a support having one side to which a said booster is securable by means of at least one screw threaded mounting bolt, a hole through said support arranged to permit passage of a respective one of said bolts, a separately formed screw threaded nut located at a side of said support opposite to said one side thereof and being positioned relative to said hole so as to be cooperable with a threaded portion of said bolt, and retaining means attached to said support and cooperating with said separately formed nut so as to hold the nut in substantial alignment with said hole and prevent rotation of the nut about the axis of its threaded bore while permitting movement of the nut towards and away from said opposite side.

It is preferred that the mounting means includes at least two mounting bolts each of which extends through the booster housing, and at least two nuts each of which is cooperable with a respective one of the bolts and which is held captive by a retainer arranged to permit limited movement of the nut away from the surface against which it is to be clamped in the mounted condition of the booster. It is further preferred that the retainer includes resilient means which biases the nut towards the aforementioned surface. That surface may be a surface of a vehicle fire wall or other vehicle bulkhead, or a surface of any other support selected to provide a mount for the booster.

In a typical arrangement, the booster housing and the mounting nuts will be located on respective opposite sides of the bulkhead or other support to which the housing is to be secured. It is therefore a feature of the mounting means in a preferred form of the present invention that each mounting bolt can be engaged with its respective nut and manipulated to clamp the housing on the support, without the need for manual engagement of the nut or its retainer. That is, the housing securing operation can be initiated and completed from one side only of the support.

In accordance with a further aspect of the present invention, there is provided a brake booster including a housing having at least two shell parts, and at least one mounting bolt holding said shell parts in assembly with one another and being operable to secure said housing to a support, said bolt having an elongate body, two screw threaded portions provided on said body and each being located adjacent a respective one of two opposite ends of said body, a pilot section forming part of said body and located between one said threaded portion and an inner end of said body so as to be insertable into the threaded bore of a mounting nut associated with said support and thereby position said nut for cooperative threaded engagement with said one threaded portion, tool engaging means adjacent an outer end of said body, and a fastening nut threadably cooperating with the said other threaded portion, said fastening nut being movable axially over said tool engaging means for engagement with and separation from said other threaded portion, said shell parts being captured between said fastening nut and an abutment on said body, and said one threaded portion is cooperable with said mounting nut so as to thereby secure said booster to said support.

In accordance with still another aspect of the present invention, there is provided a brake booster mounting bolt including, an elongate body, two screw threaded portions provided on said body and each being located adjacent a respective one of two opposite ends of said body, a pilot section forming part of said body and being located between one said threaded portion and an inner end of said body, said pilot section having a maximum dimension transverse to the longitudinal axis of said bolt which is less than the crest diameter of the adjacent said threaded portion and having a length sufficient to enter a threaded bore of a nut and thereby cause the nut to be disposed substantially coaxial with the threaded part of the bolt with which the nut is to engage, and tool engaging means adjacent an outer end of said body and having a non-circular shape in transverse cross-section.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

BRIEF DESCRIPTION OF THE DRAWING

In the drawings:

FIG. 7 is a cross-sectional view showing the relationship between the bolt and nut in the condition shown by FIG. 5.

FIG. 9 is a semi-diagrammatic perspective view, partially sectioned, of an alternative form of mounting means.

DESCRIPTION OF PREFERRED EMBODIMENTS

Figure 1:
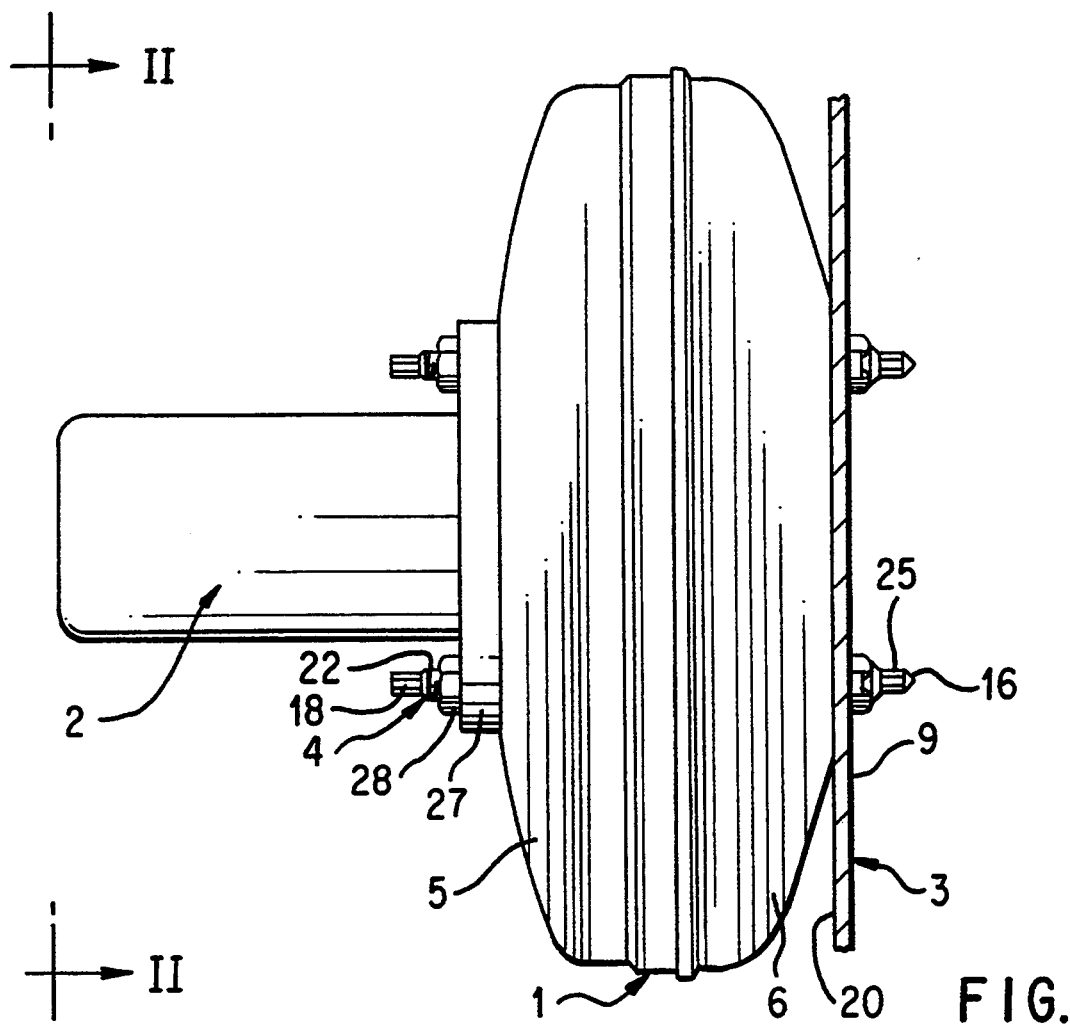
FIG. 1 is a semi-diagrammatic view of a booster assembly with brake master cylinder attached, secured to a support such as a vehicle bulkhead.
Figure 2:
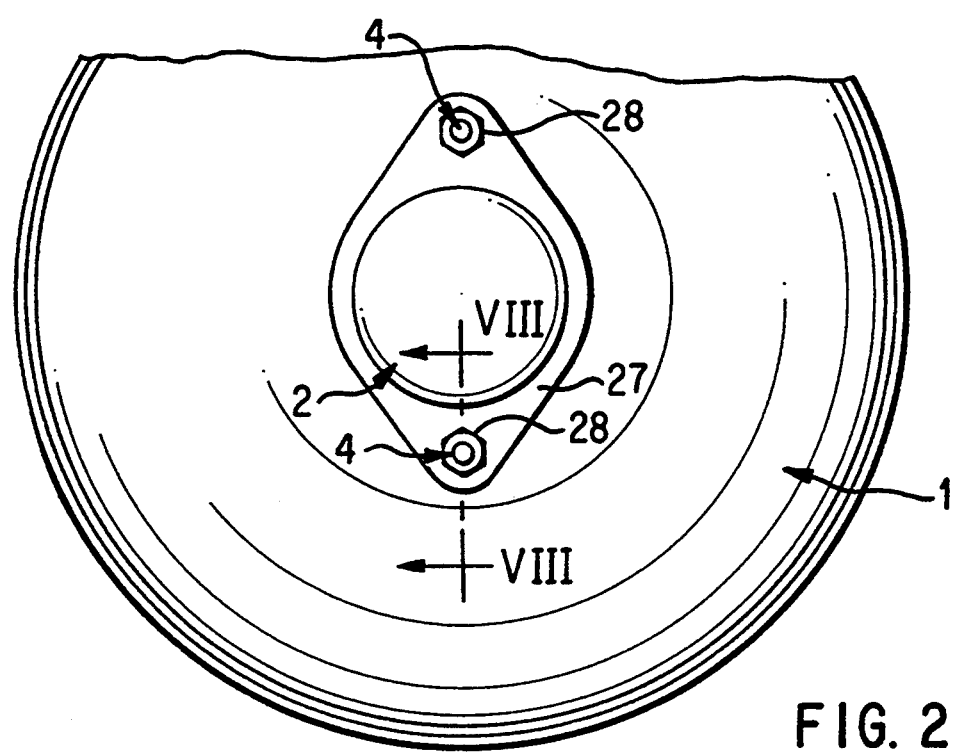
FIG. 2 is a view taken along line II—II of FIG. 1.

A typical master cylinder and booster arrangement is shown in diagrammatic form in FIGS. 1 and 2. The booster housing 1 is interposed between the master cylinder 2 and a vehicle bulkhead 3. The assembly is secured to the bulkhead 3 by two mounting bolts 4, each of which passes completely through the housing 2 and the bulkhead 3. In the particular arrangement shown, the housing 1 includes a shell composed of two parts 5 and 6, and the bolts 4 serve to hold those shell parts 5 and 6 together as hereinafter described.

Each bolt 4 passes through a respective hole 7 formed through the bulkhead 3 and cooperatively engages with a nut 8 located at the side of the bulkhead 3 opposite to the side on which the booster housing 1 is located. It is a feature of the arrangement shown that each nut 8 is held by (or formed integral with) a retainer which allows limited movement of the nut 8 away from the surface 9 of the bulkhead 3 against which the nut 8 is to be clamped.

Figure 3:
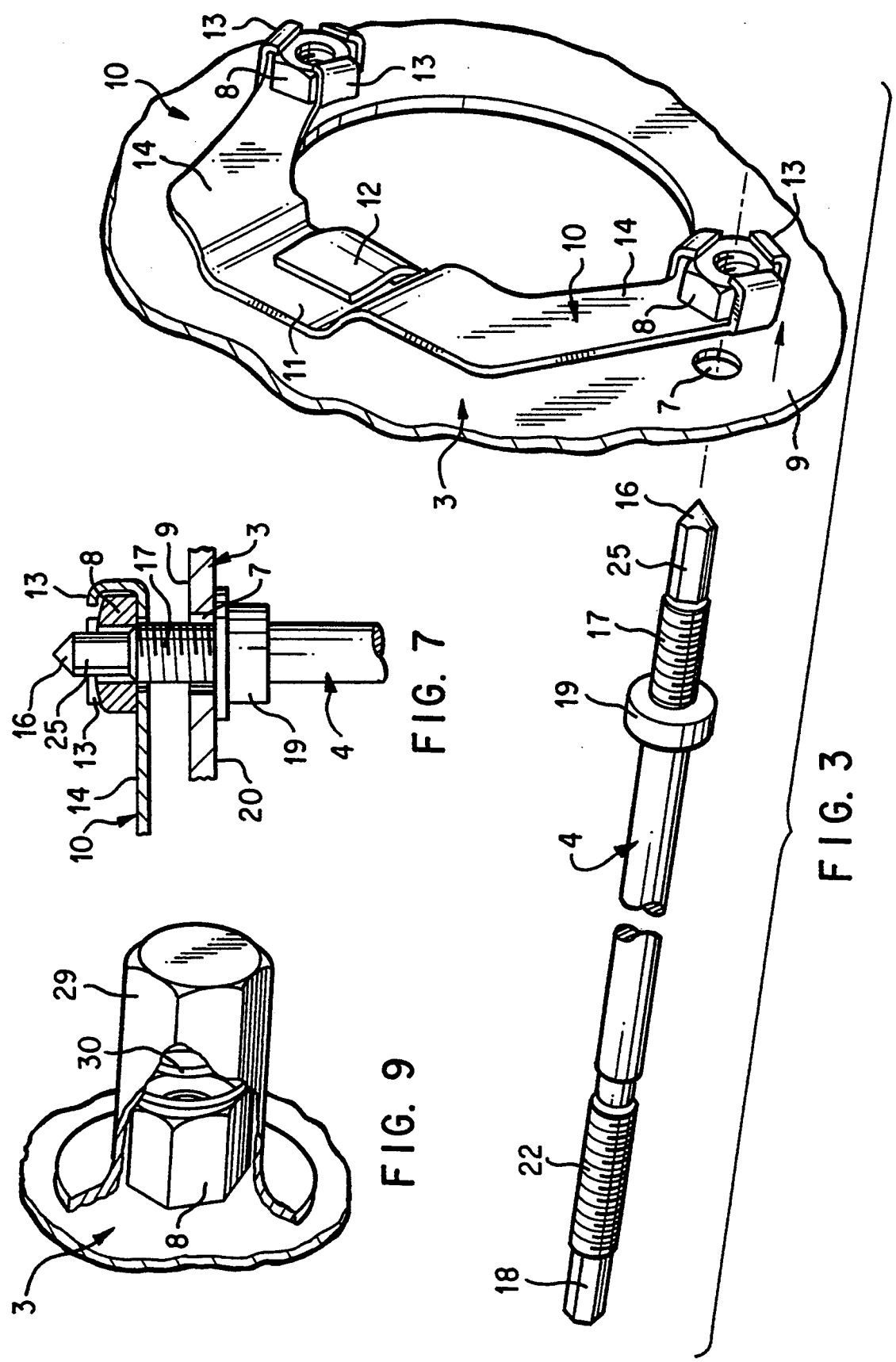
FIG. 3 is an exploded perspective view of mounting means for securing the assembly of FIG. 1 to a vehicle bulkhead.

FIGS. 3 to 6 show one possible form of retainer 10 for each nut 8. In the arrangement shown, the two retainers 10 are interconnected through a base 11 which can be attached to the bulkhead 3 in any suitable fashion. By way of example, as shown in FIG. 3, the base 11 may be secured to the bulkhead 3 by an overlying tab 12 which is an integral part of the bulkhead 3. The base 11 is secured in a position such that each retainer 10 extends over a respective one of the holes 7 and holds its respective nut 8 in substantial alignment with the hole 7.

For convenience of illustration, FIG. 3 shows the right-hand nut 8 lifted from the bulkhead 3 in the direction of the arrow so that the related hole 7 is exposed. In practice, such lifting of either of the nuts 8 is effected in the manner hereinafter described in connection with FIG. 7. FIG. 3 shows the left-hand nut 8 resting against or lying close to the bulkhead 3 under an influence described below in connection with FIG. 4.

Figure 4:
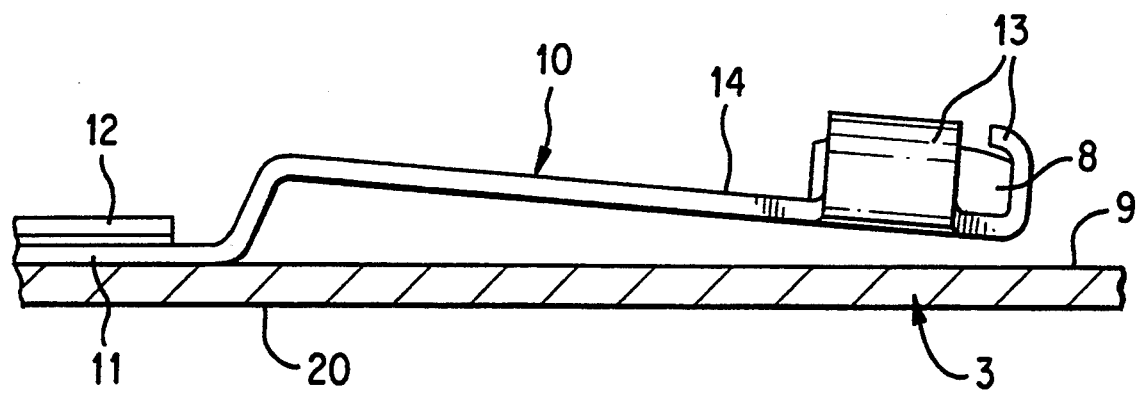
FIG. 4 is a semi-diagrammatic view showing part of the mounting means of FIG. 3.

Each retainer 10 as shown includes a nut receptacle 13 and a support arm 14 connecting that receptacle 13 to the base 11. The receptacle 13 contains a nut 8 and is arranged to hold the nut 8 so as to allow some degree of relative movement but nevertheless prevent relative rotation of the nut 8. That is, the nut 8 may be able to turn about its rotational axis to some extent relative to the receptacle 13, but there is interference between the nut 8 and the receptacle 13 which prevents the nut 8 from turning through a full rotation relative to the receptacle 13. The nut 8 may be also permitted some degree of relative lateral and axial movement. The arm 14 is preferably resilient and arranged so that when the booster mounting is not in use, the arm 14 tends to adopt a position relative to the base 11 as shown in FIG. 4. Alternative to what is shown in FIG. 4, the receptacle could actually engage the surface 9 when the mounting is not in use.

In order to secure the booster housing 1 to the bulkhead 3, each bolt 4 is passed through a respective passage 15 (FIG. 8) extending completely through the housing 1. The leading end of the bolt 4 is projected through the respective bulkhead opening 7 to engage within the threaded bore of the nut 8. In order to assist that process, the leading end of the bolt 4 is preferably provided with a conical or tapered tip 16 and a pilot section 25 which is disposed between the tip 16 and a threaded section 17 of the bolt 4. The threaded section 17 is adapted to cooperatively engage with the thread of the nut 8, and the pilot section 25 is dimensioned in cross-section so as to be slidable and rotatable in the threaded bore of the nut 8. It is preferred that the clearance between the bore of the nut 8 and the pilot section 25, is not excessive.

When the tip end of the bolt 4 is projected through the hole 7, the tip 16 enters the threaded bore of the nut 8 and with progressing axial movement of the bolt 4 tends to bring the nut 8 into axial alignment with the threaded section 17 of the bolt 4. The ability of the nut 8 to move laterally and otherwise relative to the receptacle 13 assists in that regard. Further axial movement of the bolt 4 then places the pilot section 25 within the bore of the nut 8, and as a result the nut 8 is influenced out of any tilted disposition it may have relative to the bolt 4. For that purpose, it is preferred that the axial length of the pilot section 25 is not substantially less than the axial length of the nut 8. Ideally, the pilot section 25 should have a length at least equal to that of the nut 8.

Figure 5:
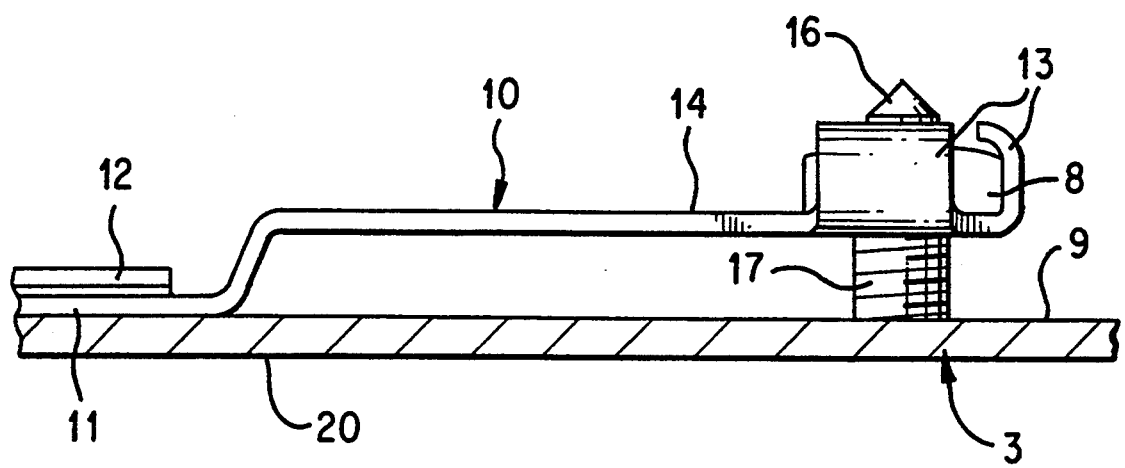
FIG. 5 is a view similar to FIG. 4 but showing a mounting bolt partially engaged with a cooperable nut.

In the course of the manipulation of the bolt 4 which results in the condition described above, the arm 14 will be influenced to flex upwards due to an upward force applied by the bolt 4 through its engagement with the captive nut 8. The arm 14 will therefore tend to adopt a position as shown in FIGS. 5 and 7.

It will usually be the case that each of the bolts 4 is assembled with the housing 1 before the housing 1 is positioned against the bulkhead 3. Thus, as the housing 1 is being placed against that bulkhead 3, the leading or tip end of each bolt 4 will project through a respective one of the openings 7. Because of the resilient nature of the retainer arms 14, both bolts 4 can be projected through the bulkhead 3 to their full possible extent without cooperative threaded engagement between the bolts 4 and the nuts 8 and without loss of alignment between the bolts 4 and the nuts 8.

Most importantly, the housing 1 can be located flat against the bulkhead 3 without substantial strain. The only resistance to such flat location is the return bias force imposed by each arm 14 on its respective bolt 4. Such flat or non-tilted positioning of the housing 1 is important. Securing of the housing 1 to the bulkhead 3 in a tilted condition involves the risk of damaging the structural integrity of the housing 1. In some prior arrangements, the risk of such tilting could not be effectively prevented unless there was simultaneous and matched rotation of each of the securing bolts.

Figure 6:
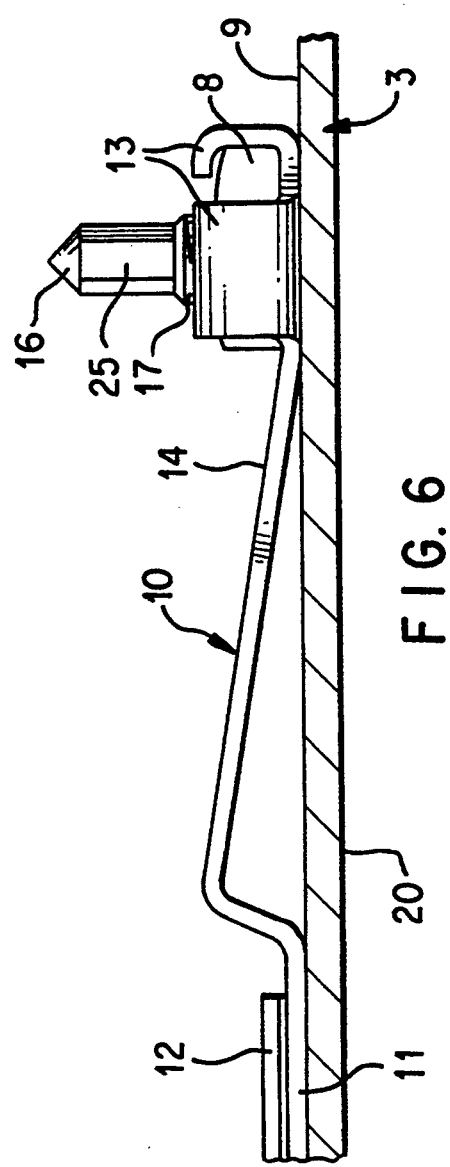
FIG. 6 is a view similar to FIG. 5, but showing the mounting bolt fully engaged with the cooperable nut.

In the arrangement according to the present invention, either of the bolts 4 can be tightened against the bulkhead 3 independent of the other and without risk of causing the housing 1 to tilt. The ability of the nuts 8 to move away from the bulkhead 3 as described above is an important factor in that regard. With this arrangement, the nut can axially move by an amount at least equal to or greater than the length of the screw threaded bore of the nut, as shown in FIGS. 4–6. Resilient biasing of the nuts 8 back towards the bulkhead 3 is advantageous, but need not be adopted in all arrangements which embody the invention.

Each bolt 4 can be rotated by any suitable tool so as to cooperatively engage with the thread of the respective nut 8. It is preferred that provision be made whereby that rotation can be effected from the side of the bulkhead 3 at which the housing 1 is located. For that purpose, in the arrangement shown, a hexagonal or other non-circular tool engaging section 18 is provided at the end portion of bolt 4 opposite to the tip 16. Since the nut 8 is held by the retainer 10, it is possible to initiate and complete the housing securing operation from one side only of the bulkhead 3.

After initial threaded cooperation between the nut 8 and the threaded section 17 of the bolt 4, further rotation of the bolt 4 will tend to draw the nut 8 downwards towards the surface 9. The arm 14 moves accordingly, and at the final clamped position of the nut 8, the arm 14 may be resiliently bent adjacent to the retainer 13 as shown in FIG. 6.

Figure 8:
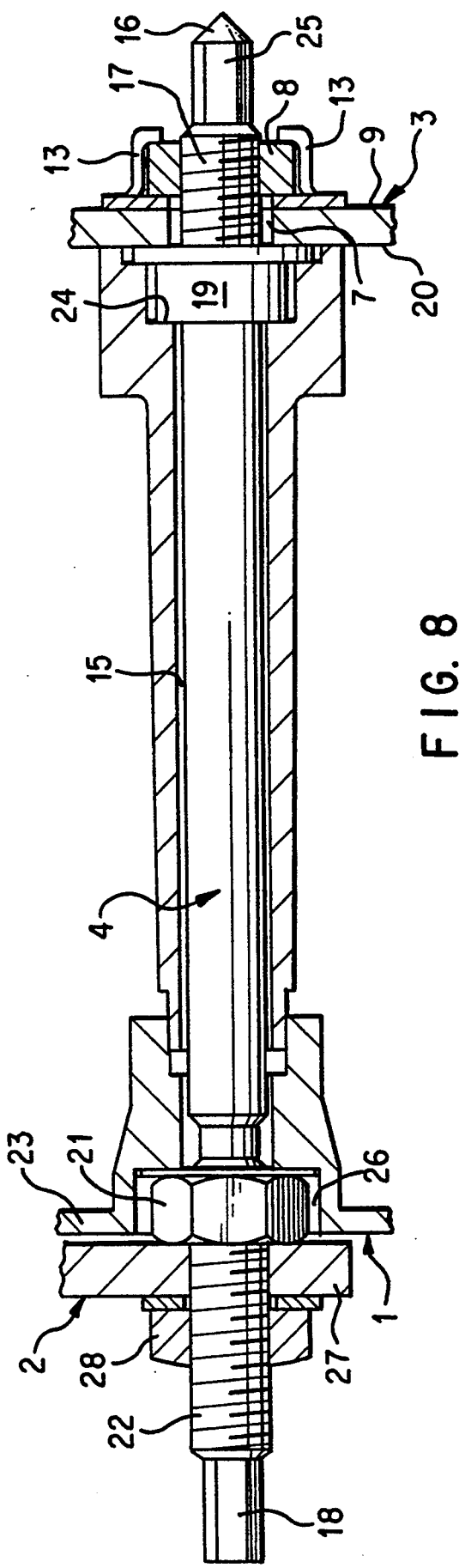
FIG. 8 is an enlarged cross-sectional view taken along line VIII—VIII of FIG. 2.

Any suitable means may be adopted to limit penetration of the bolt 4 through the bulkhead 3 and thereby achieve clamping of the nut 8 against the bulkhead 3. In the particular arrangement shown, that is achieved by a boss 19 provided on the shank of the bolt 4 adjacent the threaded section 17 and which is adapted to engage against the outer surface 20 of the bulkhead 3 as shown in FIGS. 7 and 8.

As previously stated, the bolts 4 will usually be in assembly with the housing 1 prior to installing the housing 1 against the bulkhead 3. That assembly may be completed at the place of manufacture of the booster. The example arrangement shown in the attached drawings is designed for such pre-assembly. In particular, each bolt 4 secured to the housing 1 so as to be part of the housing assembly, and functions to hold the two shells 5 and 6 of the housing 1 against separation.

In the example arrangement shown, the two housing shells 5 and 6 are captured between the boss 19 of each bolt 4 and a nut 21 cooperatively engaging with a threaded portion 22 of the bolt 4 which is at the end portion of the bolt 4 remote from the tip 16. For that purpose, each nut engages against part of an outer wall 23 of the housing shell 5, and each collar 19 bears against an internal shoulder 24 of the housing shell 6. As shown, each nut 21 may be located in a respective cavity 26 formed in the wall 23. It is preferred that the master cylinder 2 rests against the nuts 21 rather than the wall 23 when secured to the housing 1, and for that purpose each nut 21 may protrude a suitable distance out of its respective cavity 26.

The nuts 21 are usually tightened to an extent such as to establish a particular relationship between the housing shells 5 and 6 as is well known and understood by persons skilled in the relevant art. In performing that tightening operation, each bolt 4 needs to be held against rotation, and that may be achieved by use of a suitable tool engaging with the pilot section 25 which may have a hexagonal or other non-circular cross-sectional shape for that purpose. The clamping force applied to the shells 5 and 6 by the nuts 21 will not be such as to prevent rotation of each bolt 4 relative to the housing 1 for the purpose of the housing installation operation as previously described. Any suitable precaution may be adopted to prevent a change in the selected rotational position of the nut 21 relative to the bolt 4 during the housing installation operation or at any other time subsequent to securing the shells 5 and 6 in correct relationship. That may be achieved in any suitable fashion such as through use of a suitable locking compound.

The master cylinder 2 may be secured to the booster in any suitable manner, but in the example arrangement shown the bolts 4 are used for that purpose. The master cylinder 2 may be secured to the booster assembly before or after it is installed on the bulkhead 3.

As shown in FIGS. 1 and 8, the threaded section 22 of each bolt 4 extends through a flange 27 of the master cylinder 2, and a nut 28 is used to clamp that flange 27 to the nut 21. It will usually be the case that the clamping force applied to the bulkhead 3 by the bolts 4 will be sufficient to hold the bolt 4 against rotation during that master cylinder securing operation. If the master cylinder 2 is mounted on the booster assembly before that assembly is secured to the bulkhead 3, the nuts 28 will be left loose so that the bolts 4 can be rotated for the purpose of securing the booster assembly to the bulkhead 3. The nuts 28 can be tightened after that securing operation has been completed.

As previously, stated, each nut 8 can be retained on the inside of the bulkhead 3 in any suitable fashion, subject only to the requirement that the nut 8 be capable of some degree of movement away from the surface 9. FIG. 9 shows an example retainer arrangement which is an alternative to that shown in FIGS. 3 to 8. In that alternative arrangement, the nut 8 is contained in a hollow column 29 having a cross-section shape (at least internally) which is such as to prevent relative rotation of the nut 8. The nut 8 is nevertheless free to move axially and laterally within the column 29 in the manner as described in connection with the FIGS. 3 to 8 arrangement, and a coil compression spring 30 or other suitable biasing means operates to urge the nut 8 towards the bulkhead 3. The column 29 can be secured to the bulkhead 3 in any suitable fashion.

It will be appreciated from the foregoing description that the present invention provides a simple yet effective means for securing a booster housing to a vehicle bulkhead or other support. The fact that the securing operation can be initiated and completed from one side of the support is a matter of considerable advantage. Also, the movable mounting of the nuts which form part of the securing system minimises the possibility of the booster housing being forced into a tilted condition during the mounting operation.

Various alterations, modifications and/or additions may be introduced into the constructions and arrangements of parts previously described without departing from the spirit or ambit of the invention as defined by the appended claims.

Having now described our invention, what we claim as new and desire to secure by Letters Patent is:

1. A brake booster mounting including, a support having one side to which a booster is securable by means of at least one screw threaded mounting bolt, a hole through said support arranged to permit passage of a respective one of said bolts, a separately formed screw threaded nut having a bore with a length located at a side of said support opposite to said one side thereof and being positioned relative to said hole so as to be cooperable with a threaded portion of said bolt, and retaining means attached to said support and cooperating with said separately formed nut held in a portion of said retaining means so as to hold the nut in substantial alignment with said hole and prevent rotation of the nut about the axis of its threaded bore while permitting both limited lateral movement of said nut and movement of said nut towards and away from said opposite side by an amount at least equal to or greater than the length of the screw threaded bore of said nut.

2. A mounting according to claim 1, wherein the cooperation between said retaining means and said nut is such that the nut is able to tilt to a limited extent relative to said support about the axis of its threaded bore.

3. A mounting according to claim 1, wherein said nut is resiliently biased towards said support.

4. A mounting according to claim 1, wherein said retaining means includes an arm having one end attached to said support and having said nut attached to said portion at an end opposite said one end.

5. A mounting according to claim 4, wherein a resilient bias is effected through said arm.

6. A mounting according to claim 4, wherein a nut receptacle is provided at said opposite end and the said nut is located within that receptacle.

7. A mounting according to claim 4, wherein said arm is flexible and said opposite end is moved away from or towards said support as a consequence of said arm flexing.

8. A mounting according to claim 1, wherein at least two said holes are formed through said support, each said hole being arranged to permit passage of a respective said bolt, a respective said nut is provided for each said bolt, and a respective said retaining means is provided for each said nut.

9. A mounting according to claim 8, wherein said retaining means includes two retaining arms which are formed integral with one another.

10. A brake booster assembly including, a mounting according to claim 1, a brake booster having a housing composed of at least two separable shell parts and at least one said mounting bolt securing said shell parts against separation and also cooperatively engages with said nut so as to thereby secure said booster to said support, wherein a brake master cylinder is releasably attached to said booster, and said attachment is effected by means of said bolt.

11. An assembly according to claim 10, wherein said bolt includes an elongate body, two screw threaded portions provided on said body and each being located adjacent a respective one of two opposite ends of said body, a pilot section forming part of said body and being located between one said threaded portion and an inner end of said body, said pilot section having a maximum dimension transverse to the longitudinal axis of said bolt which is less than the crest diameter of the adjacent said threaded portion, and tool engaging means adjacent an outer end of said body.

12. An assembly according to claim 11, wherein said one threaded portion engages with said nut, and said shell parts are captured between an abutment on said bolt body and a fastening nut which cooperatively engages with the other said threaded portion.

13. An assembly according to claim 12, wherein said other threaded portion extends through a part of said master cylinder, and said master cylinder is held against separation from that threaded portion by a further nut cooperatively engaging with said other threaded portion.

14. A brake booster including a housing having at least two shell parts, and at least one mounting bolt holding said shell parts in assembly with one another and being operable to secure said housing to a support, said bolt having an elongate body, two screw threaded portions provided on said body and each being located adjacent a respective one of two opposite ends of said body, a pilot section forming part of said body and located between one said threaded portion and an inner end of said body so as to be insertable into a threaded bore of a mounting nut associated with said support and thereby position said nut for cooperative threaded engagement with said one threaded portion, tool engaging means adjacent an outer end of said body, and a fastening nut threadably cooperating with said other threaded portion, said fastening nut being movable axially over said tool engaging means for engagement with and separation from said other threaded portion, said shell parts being captured between said fastening nut and an abutment on said body, and said one threaded portion is cooperable with said mounting nut so as to thereby secure said booster to said support, wherein said bolt is rotatable relative to said housing so as to permit said one threaded portion to cooperate with said mounting nut for the purpose of securing said booster to said support.

15. A booster according to claim 14, wherein a part of said bolt body extends beyond said fastening nut and is exposed to provide means whereby a brake master cylinder can be attached to said booster.

16. A booster according to claim 15, wherein said exposed part includes part of said other threaded portion upon which said master cylinder can be located and which can receive a further nut for preventing separation of said master cylinder from said booster.

* * * * *